US006989906B2

(12) United States Patent
Sandercock

(10) Patent No.: US 6,989,906 B2
(45) Date of Patent: Jan. 24, 2006

(54) STABLE FABRY-PEROT INTERFEROMETER

(76) Inventor: John R. Sandercock, Fabrik am Weiher, CH-8909 Zwillikon (CH)

( * ) Notice: Subject to any disclaimer, the term of this patent is extended or adjusted under 35 U.S.C. 154(b) by 210 days.

(21) Appl. No.: 10/419,062

(22) Filed: Apr. 17, 2003

(65) Prior Publication Data

US 2004/0021872 A1 Feb. 5, 2004

(30) Foreign Application Priority Data

Jun. 19, 2002 (EP) ................................. 02013601

(51) Int. Cl.
*G01B 9/02* (2006.01)

(52) U.S. Cl. ...................................... 356/519; 356/454

(58) Field of Classification Search ................ 356/519, 356/450, 454, 506
See application file for complete search history.

(56) References Cited

U.S. PATENT DOCUMENTS 4,583,228 A * 4/1986 Brown et al. ................. 372/32
4,850,709 A * 7/1989 Ban et al. ................... 356/454
5,471,300 A * 11/1995 Ryan et al. ................. 356/519
5,724,371 A * 3/1998 Magne et al. .................. 372/6
5,835,214 A * 11/1998 Cabib et al. ................ 356/452
6,507,597 B1 * 1/2003 Graindorge et al. ........ 372/102
6,744,524 B1 * 6/2004 Kogan et al. ............... 356/519
6,804,324 B2 * 10/2004 Martynov et al. ............ 378/36
6,819,429 B2 * 11/2004 He et al. .................... 356/454
2002/0018496 A1 * 2/2002 Gutin .......................... 372/20

* cited by examiner

*Primary Examiner*—Gregory J. Poatley, Jr.
*Assistant Examiner*—Patrick Connolly
(74) *Attorney, Agent, or Firm*—Martin Fleit; Paul D. Bianco; Fleit Kain Gibbons Gutman Bongini & Bianco, P.L.

(57) ABSTRACT

A stable scanning or non-scanning Fabry-Perot interferometer and a method for stabilising the interferometer. The interferometer is composed of two plane mirrors arranged parallel to one another with a preselected optical distance between the optical surfaces of the mirrors. The interferometer radiates an output light signal in response to a light input signal applied parallel to the optical axis of the interferometer. The interferometer is stabilised by providing an arrangement for passing a plurality of reference light beams through the interferometer, the reference light beams being inclined at a preselected angle to the optical axis of the interferometer.

17 Claims, 5 Drawing Sheets

STABLE FABRY-PEROT INTERFEROMETER

BACKGROUND OF THE INVENTION

1. Field of the Invention

The invention relates to a device and method for stabilising a Fabry-Perot interferometer including two plane mirrors having optical surfaces arranged parallel to one another with a preselected optical distance between the optical surfaces of the mirrors.

2. Prior Art

The Fabry-Perot interferometer is a very high resolution spectrometer commonly used for analysing visible light. As shown in FIG. 1a it consists of two very flat mirrors 1 and 2 arranged accurately parallel to one another with a suitable scanning device 10a and 10b (such as a piezoelectric translator) which enables the spacing L between the mirrors to be varied.

The device acts as a tuneable resonator. Light incident perpendicularly on the first mirror will be transmitted by the interferometer whenever the wavelength λ satisfies the condition $$2nL=p\lambda \quad (1)$$

where L is the spacing between the mirrors, n is the refractive index of the medium between the mirrors and p is an integer. In many applications the spacing L is varied by piezoelectric means.

The transmission curve for the interferometer is given by $$T=1/[1+(4F^2/\pi^2)\sin^2(nL\cdot 2\pi/\lambda)], \quad (2)$$

and shown in FIG. 1b as a function of mirror spacing L.

Because the light makes many reflections between the mirrors the resonant peaks are sharp. The ratio of peak spacing to peak width is known as the finesse F. The finesse depends on mirror flatness and reflectivity and in typical applications values of finesse of around 30–100 are used.

Although the Fabry-perot is a very useful instrument in view of its very high resolution, it is a highly sensitive device which is difficult to keep stable. Referring to FIG. 1b it is seen that a change in mirror spacing of only 3 nm is needed to scan through the transmission peak. For stable operation therefore both mirror spacing and parallelness must be maintained to an accuracy of the order of 1 nm.

In practice such a high stability is very difficult to achieve. Even using low expansion materials for the construction, purely passive stability would require maintaining a temperature stability of better than 0.1° C. and even then mechanical relaxation tends to limit the performance.

Although active feedback stabilisation is often used in practice, this can only be used in a scanning mode and normally requires a reference beam. The feedback system works by modulating the mirror spacing and alignment in order to maximise the height of the transmitted reference beam. Such systems are complex and cannot be used to stabilise a non-scanning interferometer.

A scheme using white light fringes has been used for maintaining parallelism even in a non-scanning interferometer but the scheme cannot be used for maintaining mirror spacing.

SUMMARY OF THE INVENTION

The object of the present invention is to provide a Fabry-Perot interferometer and a method for stabilising it allowing in a simple manner a complete long-term stability of the interferometer to be achieved. The method for stabilising the Fabry-Perot interferometer shall apply equally to a scanning or non-scanning interferometer.

According to the invention, the underlying problem is solved with an interferometer, which is characterized in that means are provided for passing at least one reference light beam through the interferometer, the reference light beam being inclined at an angle (θ) to the optical axis of the interferometer. The underlying problem of the invention is also solved by a method according to the present invention.

Accordingly, the invention provides a Fabry-Perot interferometer comprising two plane mirrors arranged parallel to one another with an optical distance between the optical surfaces of the mirrors, the interferometer radiating an output light signal in response to a light input signal applied parallel to the optical axis of the interferometer, whereby means are provided for passing at least one reference light beam through the interferometer, the reference light beam being inclined at an angle (θ) to the optical axis of the interferometer. The angle (θ) between the reference light beam being and the optical axis is preferably larger than 0 degree, typically between 0 and 3 degrees.

Detection means are provided for detecting the output intensity of the or each reference light beam providing an electrical reference signal which corresponds to the intensity of the reference light beam transmitted through or reflected from the interferometer.

Preferably, a feedback loop and means for changing the optical distance between the optical surfaces of the mirrors are provided, the feedback loop receiving the electrical reference signal and being coupled to said means for changing the optical distance for optimising the intensity of the reference signal by changing and thus stabilising the optical distance to a value, for which the interferometer is in resonance for transmitting the reference light beam.

In a preferred embodiment, the Fabry-Perot interferometer comprises means for passing three reference light beams through the interferometer, the three reference light beams being parallel to each other and inclined at an angle (θ) to the optical axis of the interferometer. In this embodiment, the three reference light beams are passing preferably through the interferometer at a peripheral section of the mirrors. The three points of passage of the reference beams through the mirrors are preferably distributed regularly around the peripheral section of the mirrors. Detection means are provided in this embodiment for detecting the output intensity of each reference light beam providing a separate electrical reference signal for each reference light beam.

In another aspect of the invention, a Fabry-Perot interferometer is provided, comprising a feedback loop and means for changing the tilt of the mirrors optical surfaces are provided, the feedback loop receiving the three electrical reference signals corresponding to the intensity of the reference light beams and being coupled to said means for changing the tilt for optimising the intensity of the reference signals by changing the tilt of the mirrors optical surfaces to one another and thus stabilising the parallelness of the mirrors.

In a further embodiment of the invention, a Fabry-Perot interferometer is provided with means for passing at least one stabilisation light beam through the interferometer, whereby each stabilisation light beam corresponds to one of the reference light beams and is inclined at an angle (ψ) to the plane defined by the optical axis of the interferometer and the corresponding reference light beam. In this embodiment, detection means are provided for detecting the output intensities of the or each stabilisation light beam and the corresponding reference light beam, which provide an electrical stabilisation signal corresponding to the difference in the intensities of the stabilisation light beam and the corresponding reference light beam. Further in this embodiment, a feedback loop and means for changing the optical distance between the optical surfaces of the mirrors are provided, the feedback loop receiving the electrical stabilisation signal and being coupled to said means for changing the optical distance in order to stabilise the optical distance to a value, for which the stabilisation signal is zero, at which distance the transmitted intensities of the reference beam and the stabilisation beam are equal.

The invention also discloses a method for stabilising a Fabry-Perot interferometer, by transmitting at least one reference light beam through the interferometer, the reference light beam inclining an angle (θ) with the optical axis of the interferometer, the angle (θ) beeing preferably larger than zero. This method may be applied for stabilising the interferometer in a scanning or non-scanning mode. Scanning of the interferometer may be achieved by varying the angle (θ) between the or each reference light beam and the optical axis.

In accordance with the present invention, the improvement is provided in a Fabry-Perot interferometer comprising two plane mirrors having optical surfaces arranged parallel to one another with a preselected optical distance between the optical surfaces of the mirrors, the interferometer radiating an output light signal in response to a light input signal applied parallel to the optical axis of the interferometer, the improvement of a device for passing at least one reference light beam through the interferometer, the reference light beam being inclined at a preselected angle to the optical axis of the interferometer. Preferably, the preselected angle is between 0 and 3 degrees.

Further, in a Fabry-Perot interferometer according to the above, the further improvement is provided of a detector for detecting the output intensity of the or each reference light beam and providing an electrical reference signal which corresponds to the detected intensity of the reference light beam transmitted through or reflected from the interferometer.

A further improvement of a Fabry-Perot interferometer is the provision of a feedback loop and a second device responsive to the feedback loop for changing the optical distance between the optical surfaces of the mirrors. The feedback loop receives the electrical reference signal and is coupled to said device for changing the optical distance for optimising the intensity of the reference signal by changing, and thus, stabilising the optical distance to a value, for which the interferometer is in resonance for transmitting the reference light beam.

A still further improvement is the said device passing three reference light beams through the interferometer, the three reference light beams being parallel to each other and inclined at a preselected angle to the optical axis of the interferometer. The three reference light beams are passed through the interferometer at a peripheral section of the mirrors, and preferably, the three reference beams are distributed regularly around the peripheral section of the mirrors. The detector detects the output intensity of each reference light beam providing a separate electrical reference signal for each reference light beam. Also, there can be provideed a feedback loop and a second device for changing the tilt of the mirrors optical surfaces, the feedback loop receiving the three electrical reference signals corresponding to the intensity of the reference light beams and being coupled to said second device for changing the tilt for optimising the intensity of the reference signals by changing the tilt of the mirrors optical surfaces relative to one another, and thus, stabilising the parallelness of the mirrors.

In the novel Fabry-Perot interferometer according to the invention there can be a mechanism for passing at least one stabilisation light beam through the interferometer, whereby each stabilisation light beam corresponds to one of the reference light beams and is inclined at a preselected angle to the plane defined by the optical axis of the interferometer and the corresponding reference light beam. Also, a third detector can be provided for detecting the output intensities of the or each stabilisation light beam and the corresponding reference light beam, and providing an electrical stabilisation signal corresponding to the difference in the intensities of the stabilisation light beam and the corresponding reference light beam. In addition, there can be provided a feedback loop and a mechanism for changing the optical distance between the optical surfaces of the mirrors, the feedback loop receiving the electrical stabilisation signal and being coupled to said mechanism for changing the optical distance in order to stabilise the optical distance to a value, for which the stabilisation signal is zero, at which distance the transmitted intensities of the reference beam and the stabilisation beam are equal.

In the novel Fabry-Perot interferometer according to according to the invention the or each reference light beam is passed through the interferometer in a section of the mirrors, which is free of the input light beam. Also, there can be provided a set of mirrors for steering the input light beam in and out of the interferometer, whereby the set of mirrors transmits the wavelength of the reference light beam and reflects the wavelength of the input light beam.

The invention also contemplates a method for stabilising a Fabry-Perot interferometer comprised of two plane mirrors having optical surfaces arranged parallel to one another with a preselected optical distance between the optical surfaces of the mirrors, the interferometer radiating an output light signal in response to a light input signal applied parallel to the optical axis of the interferometer, comprising the steps of transmitting at least one reference light beam through the interferometer, and inclining the reference light beam a preselected angle to the optical axis of the interferometer. The method can include the further steps of measuring the output intensity of the reference beam transmitted through the interferometer and stabilising the optical distance of the mirrors to a value, for which the interferometer is in resonance for transmitting the reference light beam, by optimising the output intensity of the reference signal. Also, the method can include the further steps of transmitting a number of reference light beams through the interferometer, maintaining the different reference light beams parallel to each other and inclined at a preselected angle to the optical axis of the interferometer and passing the reference light beams through the mirrors at different points distributed regularly over the surface of the mirrors.

Other and further objects and advantages of the invention will become more apparent from the following detailed descripotion of the preferred embodiments when taken together with the appended drawings.

BRIEF DESCRIPTION OF THE DRAWINGS

The present invention will be illustrated, merely by way of example, in the following description and with a reference to the accompanying drawings. The drawings show.

A preferred embodiment of the Fabry-Perot interferometer and a preferred method for stabilising to according to the invention uses three parallel reference light beams 8*a*, 8*b*, 8*c*. The beams are passed not perpendicularly, but at a small angle θ relative to the axis 7 of the interferometer (represented by 1,2,3,4,L). Sensors measure the intensity of the beams and feedback loops optimise the intensity of each beam. This is indicated schematically in FIG. 2. The feedback loop is shown schematically in FIG. 3.

For the reference beams, the following equation holds:

$$2nL\cdot\cos\theta=p\lambda \tag{3}$$

The feedback loops maintain this condition, and so as θ is varied the mirror spacing L will be changed accordingly. Typical values for the angle θ lie between 0 and about 3 degrees. As an example, if L is equal to 3 mm and λ equal to 0.5 μm, the spacing L will be changed by λ/2 as θ is varied from 0.01 rdn to about 0.0163 rdn (roughly 0.573° to 0.936°).

The sensitivity of the spacing L to changes in θ can be obtained by differentiating equation 3:

$$\frac{\delta L}{L}=\frac{-\delta n}{n}+\delta\theta\cdot\tan\theta+\frac{\delta\lambda}{\lambda} \tag{4}$$

If δL is equal to 1 nm for a spacing L of 3 mm and θ is 0.01 rdn, then δθ is $3.3\times10^{-5}$ rdn. This calculation immediately shows the advantage of this scheme. A rotation of $3.3\times10^{-5}$ rdn is easy to produce accurately and reproducibly—it corresponds for example to a movement of about 10 μm at the end of a lever 330 mm long.

It should be noted that a rotation is basically temperature invariant—a uniform temperature change will alter the dimensions but not angles (provided of course that the materials used have the same coefficient of thermal expansion).

Equation 4 shows that the mirror spacing depends not only on cos θ but also on the laser wavelength λ and the refractive index n of the medium. Between the two mirrors 1,2. The variation of n is unimportant as will be shown below. The wavelength of a reference single frequency laser can be better than 1 part in $10^8$. Applied to the above example this could lead to a variation in mirror spacing of just $3.10^{-2}$ nm which is negligible.

Figure 1A:
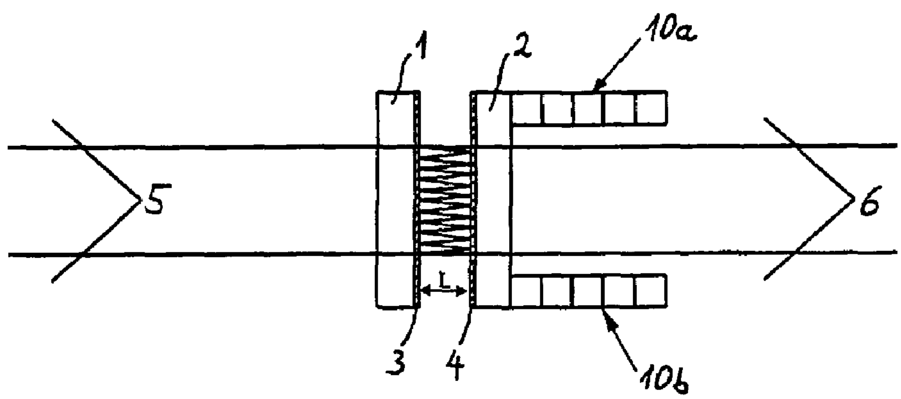
FIG. 1: Schematical view of a Fabry-Perot interferometer (FIG. 1*a*) and the interferometer transmission curve as a function of mirror spacing (FIG. 1*b*)
Figure 1B:
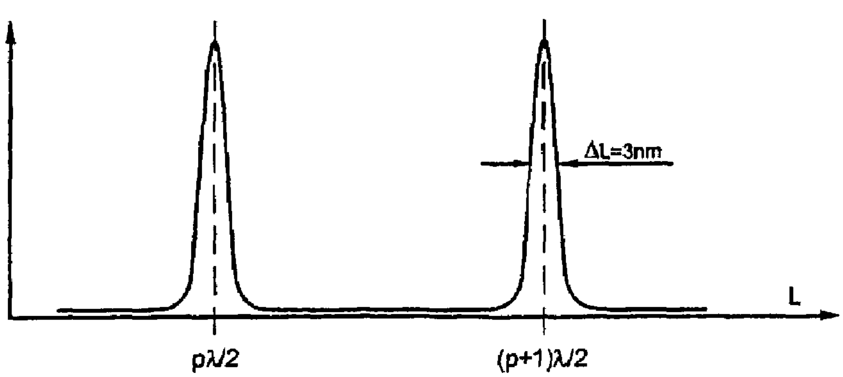
Figure 2:
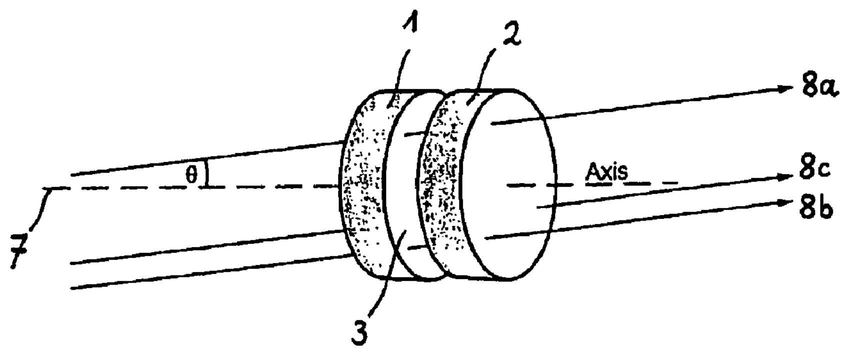
FIG. 2: A Fabry-Perot interferometer according to the present invention, showing three reference beams.
Figure 3:
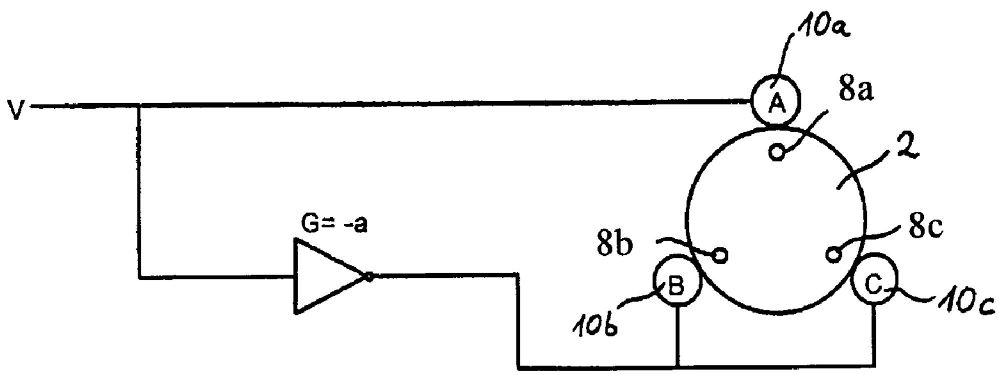
FIG. 3: Schematical drawing of a feed back loop for controlling the means for changing the parallelness and the optical distance of the optical surfaces of the mirrors.

Three piezoelectric translators 10*a*, 10*b*, 10*c* (shown in FIG. 3) are used for changing the mirror spacing and adjusting the parallelness (in FIG. 1*a* only two of the three piezoelectric translators are shown). The mirrors 1,2 and spacing L are indicated in FIG. 2. In order to make the stabilisation of the three beams independent of one another it is convenient to drive the transducers with mixed signals. For example if translator A (10*a*) receives the signal $V_A-a(V_B+V_c)$, and similar for the other axis, the small term "a " can be adjusted so that the signal $V_A$ only affects the mirror spacing for beam 8*a*/transalator A (10*a*). Likewise for beams 8*b*/translator B (10*b*) and 8*c*/translator C (10*c*) shown in FIG. 3.

By adding a modulation signal to the signals $V_A$, etc. standard phase sensitive detection techniques can be used to optimise the intensity of each beam.

A modulation signal inevitably adds some noise to system. A technique described below enables stabilisation to be achieved without using a modulation signal.

Figure 4:
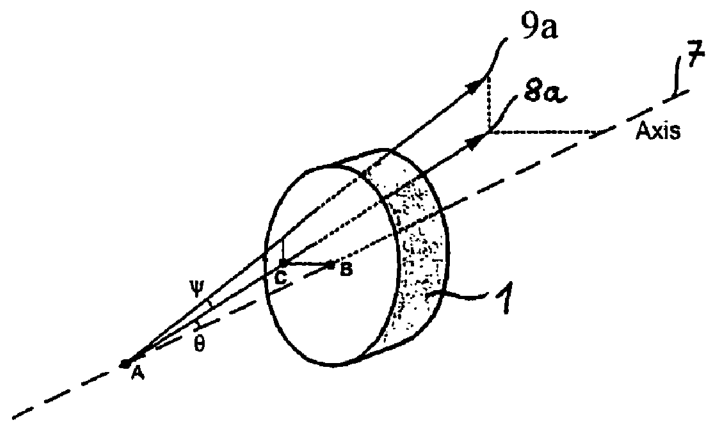
FIG. 4: Schematical view of one mirror of the interferometer, transmitted by one reference beam and one stabilisation beam, according to a preferred embodiment of the invention.

In FIG. 4 just one (8*a*) of the three reference beams has been shown for clarity. As in the scheme of FIG. 2 this reference beam 8*a* is rotated by external means through the angle θ. As in the scheme of FIG. 4 this beam 8*a* is rotated by external means through the angle θ in the plane ABC. Now however a second beam 9*a* has been formed which is at a small angle ψ to this plane. The angle ψ is of the order of 0.5 to 1 degree.

For the first beam the equation 3 holds, namely $$2nL_0\cdot\cos\theta=p\lambda$$

while for the second beam $$2nL_\psi\cdot\cos\psi=p\lambda$$

Since cos θ is very close to unity, these equations show that $L_0-L_\psi$ is essentially independent of the scan angle θ. If the mirror spacing L is set midway between $L_0$ and $L_\psi$ the intensities of both beams will be the same.

Figure 5:
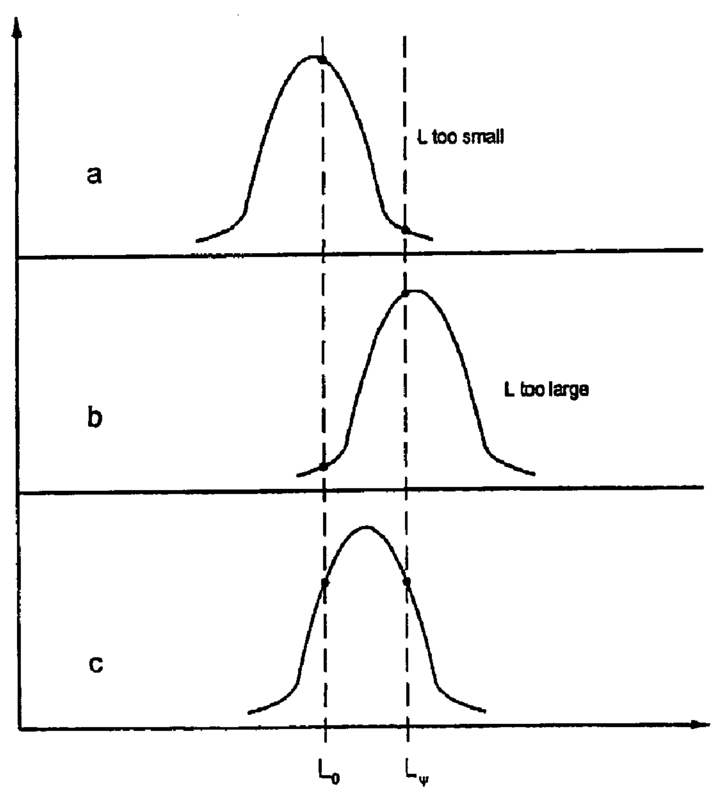
FIG. 5: Plots of the measured intensities of the reference beam and the stabilisation beam according to FIG. 4 after transmitting the interferometer, shown for different mirror spacings L.

By measuring the difference in the intensities it is now possible to determine the sign of the error ΔL in L. Referring to FIG. 5 it is seen that if the error in L is negative (L too small) then the intensity $I_0$ is greater than $I_\psi$ (situation a), while for positive ΔL the opposite is true(situation b).

If the difference in the intensities is amplified and used to drive the translator, both signals will be optimised until the intensity difference is zero corresponding to the situation c in FIG. 5.

This stabilisation method can of course be applied to all axis simultaneously. No modulation signal is required resulting in less noise and better stability.

Figure 6:
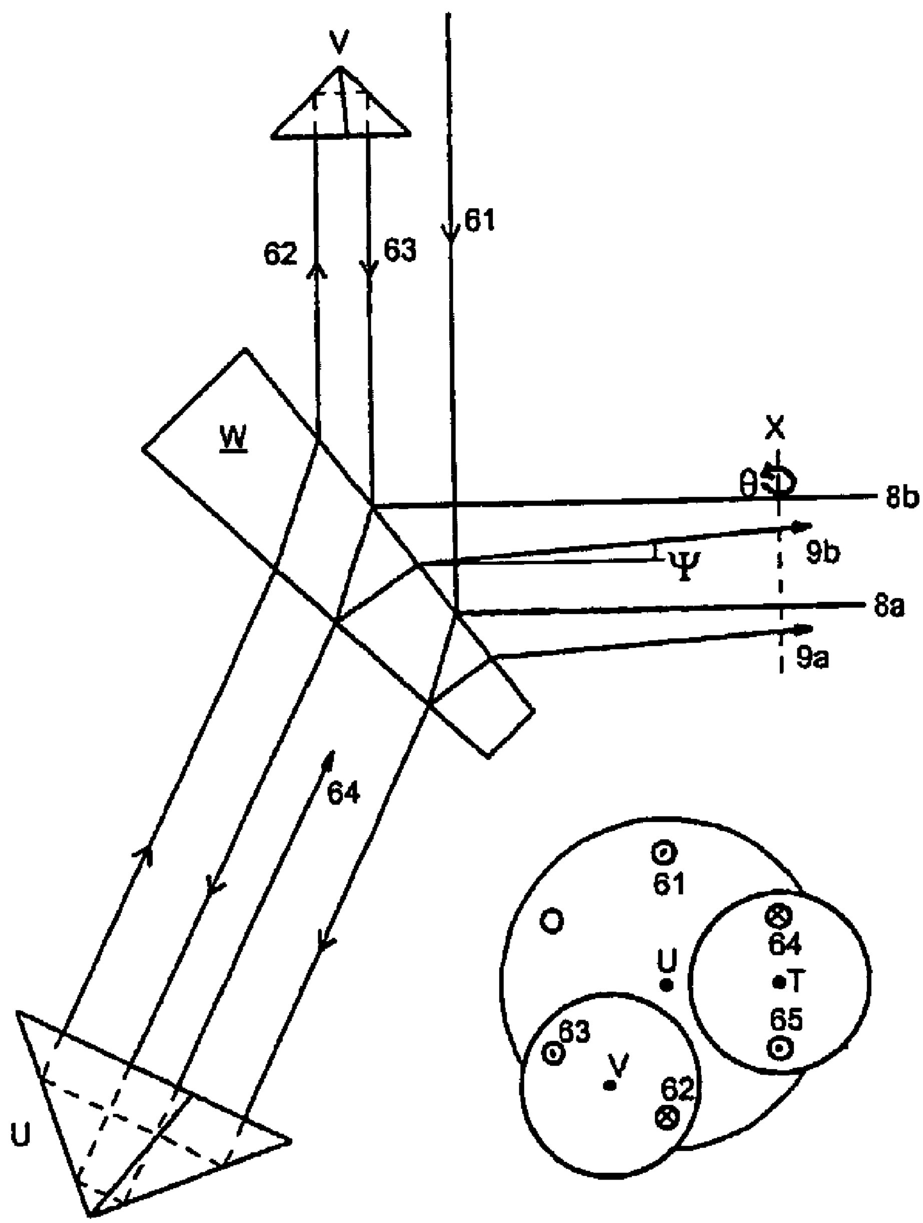
FIG. 6: Schematical view showing the optical means for deriving the reference beams and the stabilisation beams.

The interferometer as described above requires three reference beams 8*a*, 8*b*, 8*c* and three stabilisation beams 9*a*, 9*b*, 9*c*. (Stabilisation beam 9*c* is not shown.) The reference beams must be accurately parallel to each other, as must the stabilisation beams. The angle ψ between reference and stabilisation beams must remain constant as the angle θ is varied. FIG. 6 shows a simple scheme by which the beams can be derived.

Three corner cubes U, V, T and a small angle wedge W are employed. For purposes of clarity, only the corner cubes U and V and the wedge W are shown in FIG. 6. The relative positions of the 3 corner cubes U, V, T are shown in the insert of FIG. 6. The incident laser beam 61 strikes the wedge W at an angle and is refracted through the wedge W and reflected from both of its surfaces. The reference beam

8a is formed by reflection from the front side of the uncoated wedge W, the stabilisation beam 9a by reflection from the rear surface. After transmission through the wedge W the beam 61 is reflected successively by corner cubes U and V leading to the beams 62 and 63. The beam 63 then forms the second pair of reference and stabilisation beams 8b, 9b. The beam 63 transmitted through wedge W after reflection from corner cubes U and T becomes beams 64 and finally 65 which forms a third pair of reference and stabilisation beams 8c, 9c. (This third pair of reference/stabilisation beams, the beam 65 and corner cube T are not shown in FIG. 6 for clarity; also only the reflected beams of interest have been indicated—there will be many additional reflected beams, all of which can be removed with suitable masks).

The 3 pairs of reference/stabilisation beams 8a,9a; 8b,9b; 8c,9c then fall on a mirror (not shown in FIG. 6) which can be rotated about the axis X, thus allowing the angle $\theta$ to be varied while maintaining a constant angle $\psi$.

The interferometer is scanned by varying the angle $\theta$. Standard mechanical and optical techniques can be use to vary this angle. The means by which this is achieved is well-known in the prior art. It is also clear that the mirror spacing L does not vary linearly with angle $\theta$, but rather via the cosine function. By varying $\theta$ under for example stepper motor control it is straightforward to use computer control to linearise the scan.

The discussion so far has described how to stabilise and scan the interferometer using an angularly displaced reference beam 8a, 8b or 8c. In practice the interferometer will be used to scan and analyse some light source in the form of an input light signal 5 applied to the interferometer exactly parallel to its optical axis 7. It is important that the reference beam 8a, 8b, 8c does not affect the measurement. Two methods of achieving this aim are described below:

Method 1

Figure 7:
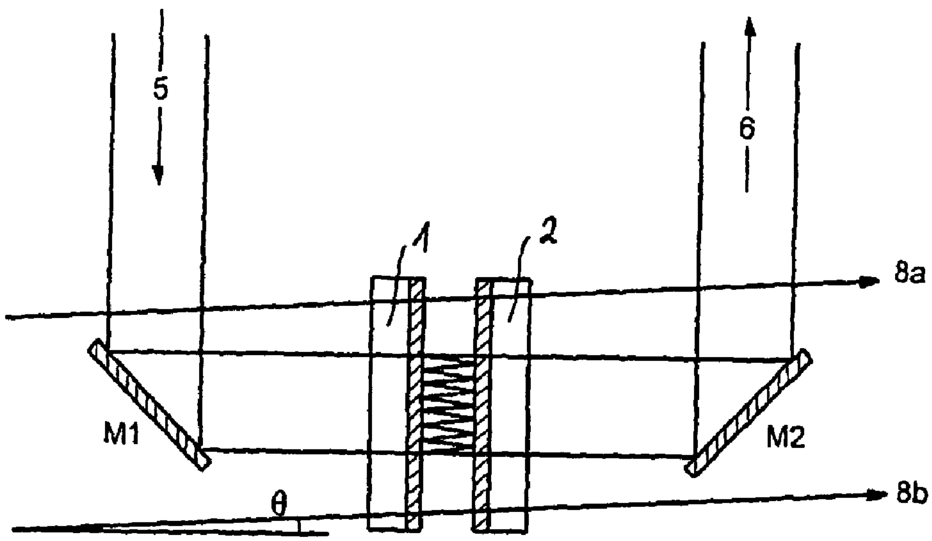
FIG. 7: Schematical arrangement of the interferometer comprising mirrors for stirring the meassurement beam in and out of the interferometer.

The three reference beams 8a, 8b, 8c occupy a relatively small part around the edge of the interferometer mirrors 1, 2. The remaining area of the mirror surfaces 3, 4 can be used for measurements. FIG. 7 shows how this might be realised. Two mirrors M1 and M2 (smaller than the interferometer mirrors 1, 2) are used to steer the measurement beam (which is the light input signal 5) in and out of the interferometer (which is the light output signal 6). The reference beams 8a, 8b, 8c pass outside M1 and M2. It is assumed here, although it is not a condition, that the measurement and reference beams have similar wavelengths.

Method 2

Figure 8:
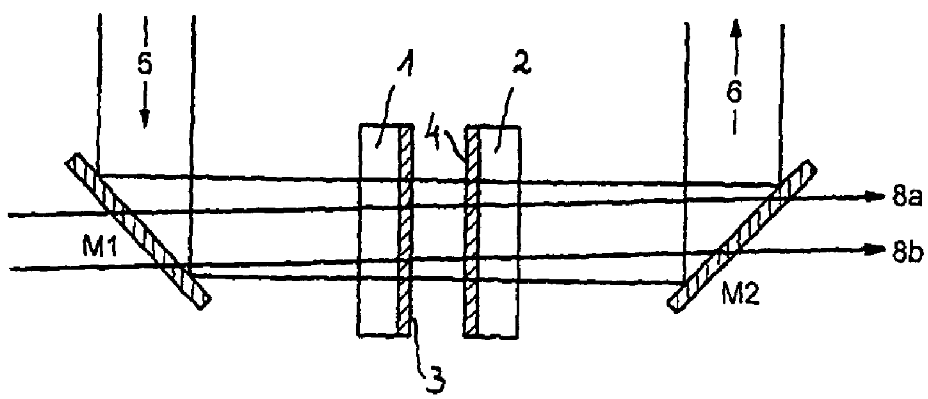
FIG. 8: Schematical arrangement of an alternative embodiment to the arrangement of FIG. 7.

An alternative scheme where the measurement beam 5 and reference beams 8a, 8b, 8c have widely differing wavelengths uses dichroic mirrors as shown in FIG. 8. Dichroic mirrors M1 and M2 transmit reference wavelength and reflect measurement wavelength. The mirror arrangement is essentially the same as in FIG. 7, except that now the whole of the interferometer mirror area is available for measurement. The interferometer mirrors in this case must be coated for high reflectivity at both reference and measurement wavelengths.

When using the interferometer for a measurement a wavelength $\lambda_1$ will be measured in order q, following equation 1, where $$2nL=q\lambda_1$$

Comparing this with equation 3 shows that $$\lambda_1 = \frac{\lambda p}{q \cdot \cos\theta}$$

In other words the measured wavelength does not depend on the refractive index (except through dispersion in n if $\lambda_1$ and $\lambda$ are widely differing).

Although the invention has been shown and described in conjunction with specific preferred embodiments changes and modifications are possible which do not depart from the teachings herein. Such are deemed to fall within the purview of the appended claims.

What is claimed is:

1. A combination for stabilizing the operation of a Fabry-Perot interferometer comprising:

a Fabry-Perot interferometer having two plane mirrors with optical surfaces arranged parallel to one another and with a preselected optical distance between the optical surfaces of the mirrors;

a first device for inputting a light input signal to the interferometer applied parallel to the optical axis of the interferometer whereupon an output light signal will be radiated in response thereto;

a second device for directing a plurality of reference light beams to the interferometer being parallel to each other and inclined at a preselected angle to the optical axis of the interferometer to one of transmit therethrough or reflect therefrom at different points distributed regularly over the surface of the mirrors and without affecting the light input signal applied parallel to the optical axis of the interferometer and the output light signal radiated in response thereto; and a third device for receiving the reference light beams after they have been one of transmitted through or reflected from the interferometer, and stabilizing the optical distance of the mirrors of the interferometer responsive to the intensity of the received reference light beams.

2. The combination according to claim 1, further including a detector for detecting the output intensity of the received reference light beams and providing an electrical reference signal which corresponds to the detected intensity of the reference light beams that has one of transmitted through or reflected from the interferometer.

3. The combination according to claim 1, wherein the second device directs the reference light beams to the interferometer at a preselected angle with the optical axis of the interferometer being between 0 and 3 degrees.

4. The combination according to claim 2, further including a feedback loop and a fourth device responsive to the feedback loop for changing the optical distance between the optical surfaces of the mirrors, the feedback loop receiving the electrical reference signal and being coupled to said fourth device for changing the optical distance for optimising the intensity of the reference signals by changing, and thus, stabilising the optical distance to a value, for which the interferometer is in resonance for transmitting the reference light beams.

5. The combination according to claim 1, wherein the reference light beams are directed to pass through the interferometer at a peripheral region of the mirrors.

6. The combination according to claim 5, wherein the reference light beams are distributed regularly around the peripheral region of the mirrors.

7. The combination according to claim 1, wherein each reference light beam is passed through the interferometer in a region of the mirrors, which is free of the input light beam.

8. The combination according to claim 1, further including a detector to detect the output intensity of each reference light beam and to provide a separate electrical reference signal for each reference light beam.

9. The combination according to claim 8, further including a feedback loop and a fourth device for changing the tilt of the mirrors optical surfaces, the feedback loop receiving the three electrical reference signals corresponding to the intensity of the reference light beams and being coupled to said fourth device for changing the tilt of the mirrors optical surfaces for optimising the intensity of the reference signals by changing the tilt of the mirrors optical surfaces relative to one another, and thus, stabilising the parallelness of the mirrors.

10. The combination according to claim 1, wherein a set of mirrors steers the input light beam in and out of the interferometer, and whereby the set of mirrors transmits the wavelengths of the reference light beams and reflects the wavelength of the input light beam.

11. A combination for stabilizing the operation of a Fabry-Perot interferometer comprising:

a Fabry-Perot interferometer having two plane mirrors with optical surfaces arranged parallel to one another and with a preselected optical distance between the optical surfaces of the mirrors;

a first device for inputting a light input signal to the interferometer applied parallel to the optical axis of the interferometer whereupon an output light signal will be radiated in response thereto;

a second device for directing at least one reference light beam to the interferometer inclined at a preselected angle to the optical axis of the interferometer to one of transmit therethrough or reflect therefrom without affecting the light input signal to the interferometer applied parallel to the optical axis of the interferometer and the output light signal radiated in response thereto;

a third device for receiving the at least one reference light beam after it has been one of transmitted through or reflected from the interferometer, and stabilizing the optical distance of the mirrors of the interferometer responsive to the intensity of the at least one received reference light beam; and a mechanism for associating a stabilization light beam with each reference light beam, and passing the associated stabilization light beam through the interferometer, inclined at a preselected angle to the plane defined by the optical axis of the interferometer and the associated reference light beam.

12. The combination according to claim 11, further including a detector for detecting the output intensity of each reference light beam and its associated stabilization light beam, and providing an electrical stabilization signal corresponding to the difference in the intensities of each reference light beam and its associated stabilization light beam.

13. The combination according to claim 12, further including a feedback ioop and a mechanism for changing the optical distance between the optical surfaces of the mirrors, the feedback loop receiving the electrical stabilisation signal and being coupled to said mechanism for changing the optical distance in order to stabilise the optical distance to a value, for which the stabilisation signal is zero, at which distance the transmitted or reflected intensities of the or each reference beam and the associated stabilisation beam are equal.

14. A method for stabilizing a Fabry-Perot interferometer including two plane mirrors having optical surfaces arranged parallel to one another with a preselected optical distance between the optical surfaces of the mirrors and having an optical axis, the method comprising:

applying a light input signal parallel to the optical axis of the interferometer, whereupon the interferometer radiates an output light signal in response thereto;

either transmitting or reflecting a plurality of reference light beams through or from the interferometer without affecting the applied light input signal and the radiated output light signal, maintaining the reference light beams parallel to each other and inclined at a preselected angle to the optical axis of the interferometer; and passing the reference light beams through the mirrors at different points distributed regularly over the surface of the mirrors.

15. The method according to claim 14, further including:

measuring the output intensity of each reference light beam transmitted through or reflected from the interferometer; and stabilizing the optical distance of the mirrors to a value, for which the interferometer is in resonance for transmitting the reference light beams, by optimising the output intensity of the reference signals.

16. An interferometer system comprising:

a scanning Fabry-Perot interferometer having two plane mirrors with optical surfaces arranged parallel to one another with a predetermined optical distance between the optical surfaces of the mirrors and having an optical axis, the interferometer radiating an output light signal in response to a light input signal applied parallel to the optical axis of the interferometer;

means for directing at least one reference light beam at the interferometer, the at least one reference light beam being inclined at an angle to the optical axis of the interferometer, and resulting in the at least one reference light beam being one of transmitting through and reflecting from the interferometer;

detection means for detecting the output intensity of the at least one reference light beam transmitted through or reflected from the interferometer and providing an electrical reference signal which corresponds to the output intensity of the reference light beam;

first adjusting means for changing the optical distance between the optical surfaces of the mirrors;

a feedback loop receiving the electrical reference signal; and second adjusting means for varying the angle between the at least one reference light beam and the optical axis, wherein the feedback loop is coupled to the first adjusting means for changing the optical distance for optimizing the output intensity of the reference signal by changing and thus, stabilizing the optical distance to a value, for which the interferometer is in resonance for transmitting the at least one reference light beam, so that the interferometer can be scanned by varying the angle between the at least one reference light beam and the optical axis.

17. A method for stabilizing and scanning a Fabry-Perot interferometer including two plane mirrors arranged parallel to one another with an optical distance between the optical surfaces of the mirrors and having an optical axis, the method comprising:

applying a light input signal parallel to the optical axis of the interferometer, in response to which the interferometer radiates an output light signal;

either transmitting or reflecting at least one reference light beam through or from the interferometer without affecting the applied light input signal and the radiated output light signal, the at least one reference light beam inclining an angle with the optical axis of the interferometer;

scanning of the interferometer by varying the angle between the at least one reference light beam and the optical axis of the interferometer;

measuring the output intensity of the at least one reference light beam transmitted through or reflected from the interferometer and providing a reference signal for the at least one reference light beam; and optimizing the output intensity of the at least one reference signal by changing the optical distance of the mirrors to a value, for which the interferometer is in resonance for transmitting the at least one reference light beam.

* * * * *